US007185004B1

(12) United States Patent
Simmen et al.

(10) Patent No.: US 7,185,004 B1
(45) Date of Patent: Feb. 27, 2007

(54) SYSTEM AND METHOD FOR REVERSE ROUTING MATERIALIZED QUERY TABLES IN A DATABASE

(75) Inventors: David Everett Simmen, San Jose, CA (US); Mir Hamid Pirahesh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/298,853

(22) Filed: Dec. 9, 2005

(51) Int. Cl.
G06F 7/00 (2006.01)
G06F 12/00 (2006.01)

(52) U.S. Cl. .......................................................... 707/3
(58) Field of Classification Search ................ 707/3, 707/10, 100, 4, 5; 715/500
See application file for complete search history.

(56) References Cited

U.S. PATENT DOCUMENTS

| 5,930,785 | A | 7/1999 | Lohman et al. |
| 6,421,663 | B1 | 7/2002 | Chen et al. |
| 6,449,609 | B1 * | 9/2002 | Witkowski ..................... 707/4 |
| 6,513,034 | B1 | 1/2003 | Leung et al. |
| 6,865,567 | B1 | 3/2005 | Oommen et al. |
| 6,865,569 | B1 | 3/2005 | Gui et al. |
| 2005/0114311 | A1 * | 5/2005 | Cheng et al. .................. 707/3 |

OTHER PUBLICATIONS

Markl, V., et al., "Robust Query Processing through Progressive Optimization", SIGMOD 2004.

Liu, J., et al., "Information-Directed Routing in Ad Hoc Sensor Networks", WSNA 2003.

Graefe, G., "Query Evaluation Techniques for Large Databases", ACM Computing Surveys, vol. 25, Jun. 1993.

Xu, Bin et al., "Reverse Routing-Based Response Data Query Active Packet Comprising Model," Mini-Micro Systems, vol. 24, No. 2, 2003 (Chinese with English Abstract).

Cho, H., et al. "R-BU: Recursive Binding Update for Route Optimizationin Nested Mobile Networks," High Speed Networks and Multimedia Communications: 7th IEEE International Conference, 2004.

Cho, H., et al. "$RBU_+$: Recursive Binding for End-to-End Route Optimization in Nested Mobile Networks," High Speed Networks and Multimedia Communications: 7th IEEE International Conference, vol. 3079, 2004 (Abstract).

* cited by examiner

*Primary Examiner*—Sam Rimell
(74) *Attorney, Agent, or Firm*—Samuel A. Kassatly

(57) ABSTRACT

A reverse routing system optimizes execution of a query that accesses data stored in one or more materialized query tables in a database of a computer system. The system receives a query directly referencing the materialized query table. The system identifies the referenced materialized query tables in a catalogue of materialized query tables and a defining query associated with the referenced materialized query table. The system substitutes the defining query for the referenced materialized query table in the received query. The system adds the referenced materialized query table to the set of eligible materialized query tables that are selected using query matching algorithms so that they can be considered for routing by the query optimizer.

18 Claims, 4 Drawing Sheets

400

405 RECEIVE QUERY THAT DIRECTLY REFERENCES MATERIALIZED QUERY TABLE(S)

410 IDENTIFY MATERIALIZED QUERY TABLES(S) REFERENCED IN RECEIVED QUERY

415 IDENTIFY DEFINING QUERY OF EACH REFERENCED MATERIALIZED QUERY TABLE(S)

420 SUBSTITUTE IDENTIFIED DEFINING QUERY FOR THE REFERENCED MATERIALIZED QUERY TABLE(S) IN THE RECEIVED QUERY

425 INITIALIZE AN ELIGIBILITY LIST OF MATERIALIZED QUERY TABLES WITH REFERENCED MATERIALIZED QUERY TABLE(S)

FIG. 4

SYSTEM AND METHOD FOR REVERSE ROUTING MATERIALIZED QUERY TABLES IN A DATABASE

FIELD OF THE INVENTION

This invention relates in general to database management systems performed by computers, and in particular, using reverse routing of materialized query tables to optimize query execution.

BACKGROUND OF THE INVENTION

The use of a Relational Database Management System (RDBMS) is well known in the art. Relational databases of the relational database management system are organized into tables that are comprised of rows and columns of data, wherein the rows are tuples and the columns are attributes. The tables are typically stored on direct access storage devices (DASD), such as magnetic or optical disk drives, for semi-permanent storage.

The use of a structured query language (SQL) interface to access data in the relational database management system is also well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages such as C and COBOL.

The definitions for SQL provide that a RDBMS responds to a particular query with a particular set of data given a specified database content, but the method that the RDBMS uses to actually find the required information in the tables is left up to the RDBMS. Typically, more than one method can be used by the RDBMS to access the required data. Each of these methods is a query execution plan (QEP).

The query execution plan is a compiled run-time structure used for executing the SQL statement. The query execution plan is the path the RDBMS uses to get to the data requested by the SQL statements. For example, an SQL statement may search an entire table space or the SQL statement may use an index. The query execution plan indicates how well an SQL statement performs. The data associated with the query execution plan is stored in a catalogue or, optionally, in a plan table.

During bind time, the RDBMS software uses various data, including statistics in a RDBMS catalogue, to determine which query execution plan to use. A utility updates the RDBMS catalogue with statistics on table spaces, indexes, tables, and columns. Additionally, when an SQL statement is processed during a bind phase, a query execution plan is determined for the SQL statement.

Typically, when there are two or more query execution plans available for selection, a query execution is selected based on a detailed analysis of the execution costs of each alternative query execution plan. The RDBMS selects an optimal query execution plan to minimize the computing time or resources used and, therefore, minimize the cost of performing the query.

One approach to further minimize computing time or resources used in executing a query utilizes a materialized query table (MQT). Materialized query tables are tables whose contents are defined by a query. In the current state of the art, a materialized query table is used to speed up the execution of another query by effectively rewriting the original query into a semantically equivalent query that references the materialized query table. The rewrite can be performed directly by a user or a tool writing the query. When performed directly by a user, the rewrite of the query using a materialized query table is referenced as "direct MQT substitution". When performed automatically by the query optimizer, the rewrite of the query using a materialized query table is referenced as "MQT routing".

For example, consider a federated database configuration in which a data warehouse managed by one RDBMS (RDBMS1) is connected to a data mart that is managed by another RDBMS (RDMBS 2). The tables of RDBMS2 are derived from certain tables of RDBMS1 and are represented in RDBMS2 using materialized query tables of the RDBMS2. For example, the RDBMS2 table CA-Cities comprising information about California cities is derived from the table of the RDBMS1 that contains information about US-Cities, and is defined as follows:

CREATE TABLE RDBMS2.CA-Cities as (SELECT * FROM RDBMS1.US-Cities A WHERE A.state='CA')

Queries of RDBMS2 can be written directly against the local materialized query tables. Although this technology has proven to be useful, it would be desirable to present additional improvements. On occasion, a query of RDBMS2 is required to drill down to the server of RDBMS1 to obtain more detailed information. Such a query is the following exemplary query that requests detailed sales information for California cities in a specific zip code.

SELECT *
FROM RDBMS2.CA-Cities a, RDBMS1.Sales b
WHERE a.ZipCode=95120 AND a.citycode=b.citycode.

In the current state of the art, a query optimizer typically considers only execution plans that perform the join by moving one of the tables. For example, the query optimizer may move the entire Sales table from the RDBMS1 to the RDBMS2. Alternatively, the query optimizer may consider performing a separate probe of the Sales table for each qualifying city code. Both of these execution plans can be inefficient due to excessive movement of data or communication between one data source and another.

When a user specifies a materialized query table in a query, a conventional query optimizer is constrained to use those specified query tables even though the resulting query performance is not optimum. A conventional query optimizer does not consider the inverse of the routing process of the materialized query table whereby a query that uses direct MQT substitution is automatically rewritten by the optimizer into a semantically equivalent query that does not reference the materialized query table. This process is referenced as "reverse MQT routing" (further referenced herein as reverse routing).

Consider the following equivalent query that is arrived at using a reverse routing optimization:

SELECT
FROM RDBMS1.US-Cities a, RDBMS1.Sales b
WHERE A.state='CA' a AND a.ZipCode=95120 AND a.citycode=b.citycode.

Execution plans for this equivalent query are likely much more efficient than alternative plans for the original query as the tables participating in the join reside on the same data source, RDBMS1.

What is therefore needed is a system, a computer program product, and an associated method for reverse routing a materialized query tables in a database. The need for such a solution has heretofore remained unsatisfied.

SUMMARY OF THE INVENTION

The present invention satisfies this need, and presents a system, a computer program product, and an associated method (collectively referred to herein as "the system" or "the present system") for reverse routing a materialized query table in a database. The present system optimizes execution of a query that references one or more materialized query tables in a database of a computer system.

The present system receives a query directly referencing a materialized query table (note: this should hold for more than one of course). The present system retrieves materialized query table metadata from the RDBMS catalogs. The present system identifies a defining query associated with the referenced materialized query table. The present system substitutes the defining query for the referenced materialized query table in the received query.

The present system generates an eligibility list of materialized query tables, in the form of a set of eligible materialized query tables, from the catalogue of materialized tables in which the eligibility list can be used to generate an efficient query execution plan. The present system initializes the eligibility list with the identified materialized query tables referenced directly in the received query.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a process flow chart illustrating a method of the reverse routing system of FIG. 1 in rewriting a query comprising references to a materialized query table.

DETAILED DESCRIPTION OF PREFERRED EMBODIMENTS

Figure 1:
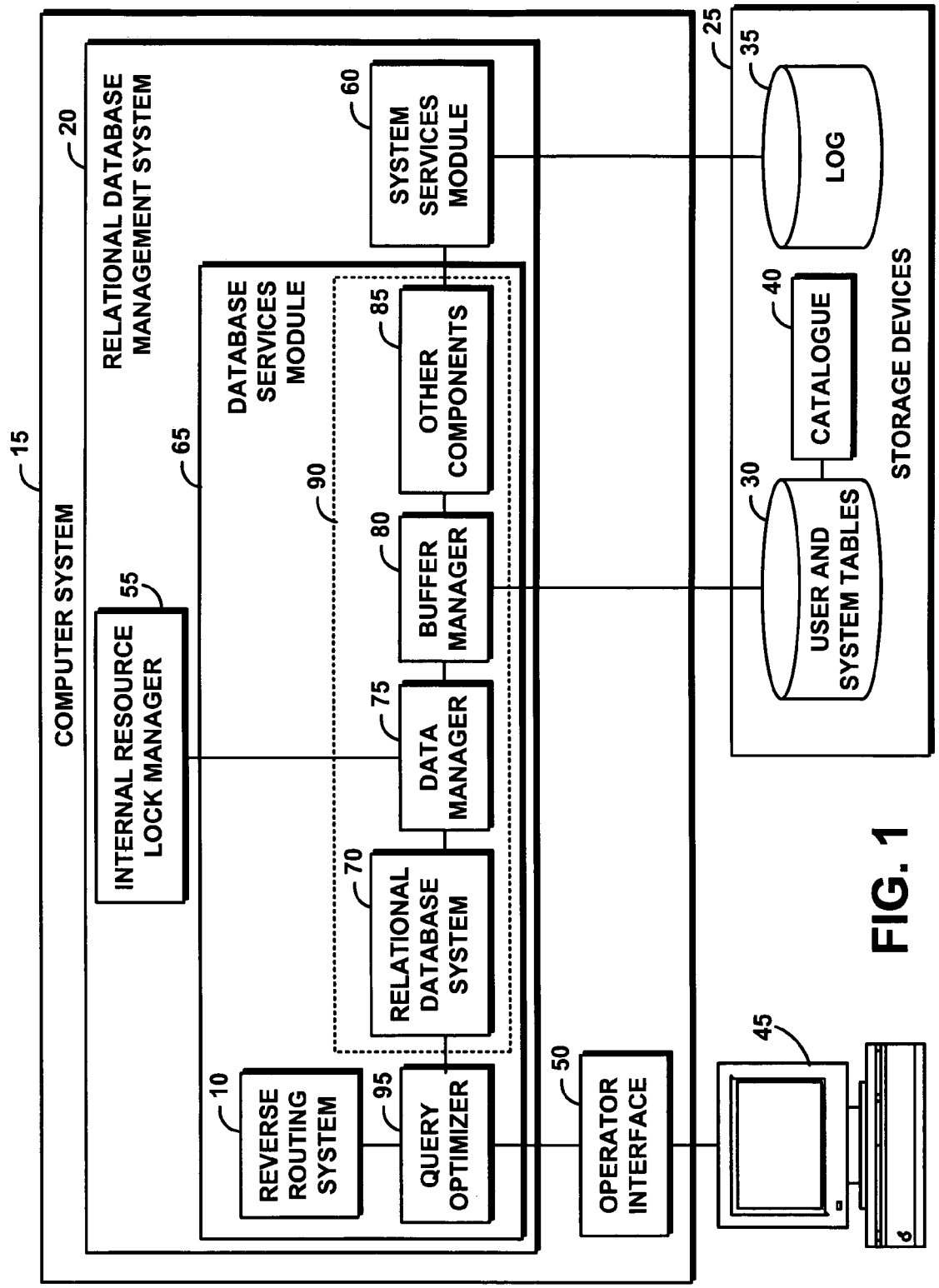
FIG. 1 is a schematic illustration of an exemplary operating environment in which a reverse routing system of the present invention can be used.

FIG. 1 portrays an exemplary overall environment in which a system, a computer program product, and an associated method (the "system 10") for reverse routing a materialized query table according to the present invention may be used. System 10 comprises a software programming code or a computer program product that is typically embedded within, or installed on a computer system 15. Alternatively, system 10 can be saved on a suitable storage medium such as a diskette, a CD, a hard drive, or like devices.

In the exemplary environment of FIG. 1, the computer system 15 comprises a relational database management system 20 (RDBMS20). The computer system 15 further comprises one or more processors connected to one or more data storage devices 25 that store one or more relational databases, such as a fixed or hard disk drive, a floppy disk drive, a CDROM drive, a tape drive, or other device. The storage devices 20 comprise user and system tables 30 and a log 35. The user and system tables 30 comprise a catalogue 40. The catalogue 40 comprises metadata used to route the materialized query tables.

Operators of the computer system 15, represented by a computer 45, use a standard operator interface 50 to transmit electrical signals to and from the computer system 15 that represent commands for performing various search and retrieval functions, termed queries, against the databases. Computer 45 may also be a monitor or a terminal. Computer 45 may be located locally with the computer system 15 or remotely, accessing computer system 15 via a network such as, for example, the Internet. The queries against the databases conform to the structured query language (SQL) standard, and invoke functions performed by software of the RDBMS20.

The RDBMS20 comprises an internal resource lock manager 55, a systems services module 60, and a database services module 65. The internal resource lock manager 55 handles locking services. Because the RDBMS20 treats data as a shared resource, any number of users are allowed to access the same data simultaneously. Consequently, concurrency control is required to isolate users and to maintain data integrity. The systems services module 60 controls an overall execution environment of RDBMS20, including managing data sets of log 35, gathering statistics, handling startup and shutdown, and providing management support.

The database services module 65 comprises a relational database system 70, a data manager 75, a buffer manager 80, and other components 85 (collectively referenced as sub-modules 90). Other components 85 comprise components such as an SQL interpreter. The sub-modules 90 support the functions of the SQL language, i.e., definition, access control, interpretation, compilation, database retrieval, and update of user and system data. Additionally, a query optimizer 95 works with the sub-modules 90 to optimize queries for execution.

System 10 is generally used in optimizing SQL statements executed under the control of the database services module 65. The database services module 65 retrieves or receives the SQL statements, wherein the SQL statements are generally stored in a text file on the data storage devices 25 or are interactively entered into the computer system 15 by an operator via computer 45. The database services module 65 then derives or synthesizes instructions from the SQL statements for execution by the computer system 15, wherein the query optimizer 95 optimizes the instructions for execution using system 10. Generally, the software of RDBMS20, the SQL statements, and the instructions derived therefrom, are all tangibly embodied in or readable from a computer-readable medium, e.g., one or more of the data storage devices 25.

Moreover, the software of the RDBMS 20, the SQL statements, and the instructions derived therefrom are all comprised of instructions that, when read and executed by the computer system 15, cause the computer system 15 to perform the steps or functions necessary to implement or use system 10. Under control of an operating system, the software of the RDBMS 20, the SQL statements, and the instructions derived therefrom may be loaded from the data storage devices 25 into a memory of the computer system 15 for use during actual operations.

Thus, system 10 may be implemented as a method, apparatus, or article of manufacture using standard programming or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Materialized query tables are typically created to serve as a starting point for responding to a query, thereby speeding up execution of the query. However, system 10 uses existing infrastructure for MQT routing to implement reverse MQT routing. In the query optimization process, materialized query tables directly referenced in the query are removed and replaced with an associated defining query. Consequently, system 10 enables the query optimizer 95 to consider query execution plans that use the directly referenced materialized query table as well as those query execution plans that do not use the directly referenced materialized query table.

Figure 2:
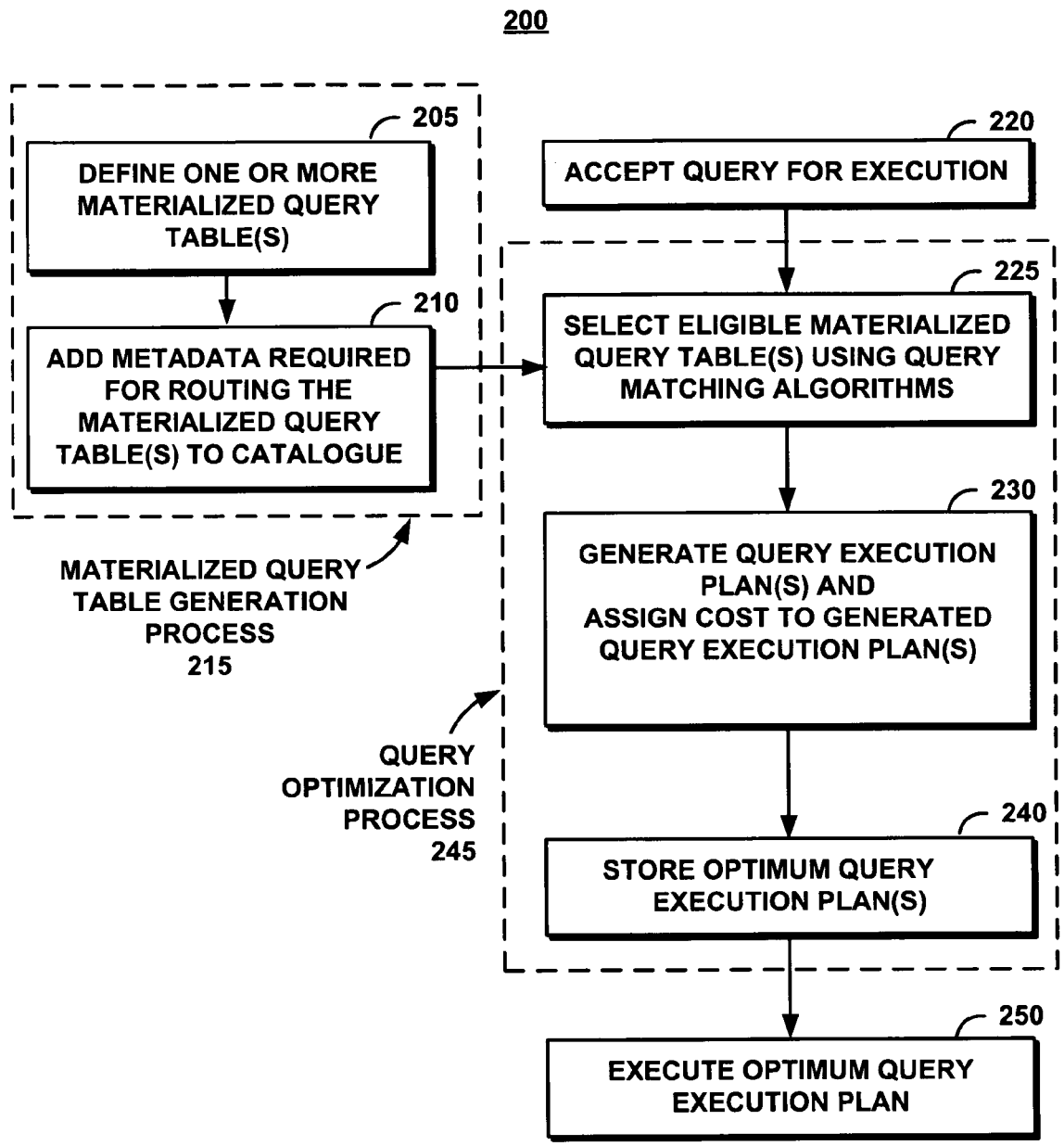
FIG. 2 is a process flow chart illustrating a conventional method of generating materialized query tables utilized in optimizing queries using MQT routing.

FIG. 2 illustrates a conventional method of the RDBMS 20 in optimizing one or more queries using MQT routing. The RDBMS 20 defines one or more materialized query tables (step 205). The RDBMS 20 adds metadata required for routing the materialized query table(s) to catalogue 40 (step 210). A materialized query table generation process 215 comprises steps 205 and 210. The materialized query table generation process 215 is independent of query optimization.

The RDBMS 20 accepts a query for execution (step 220). The query optimizer 95 selects one or more eligible materialized query tables using query matching algorithms and metadata from catalogue 40 (step 225). The selected eligible materialized query tables are those materialized query tables that can be used as a starting point to answer the accepted query.

The query optimizer 95 generates one or more query execution plans and assigns a cost to the generated query execution plans (step 235). The assigned cost is generally predictive of the execution efficiency of the associated query execution plan. The RDBMS 20 stores the generated query execution plans in catalogue 40 (step 240) for retrieval and interpretation by the RDBMS 20 whenever a database application executes the accepted query. A query optimization process 245 comprises steps 225 through 240). During the query optimization process 245, query execution plans that route to 0 or more of the eligible materialized query tables are considered for routing. The query optimizer 95 selects an optimum query based on cost; the RDBMS 20 executes the optimum query (step 250).

Figure 3:
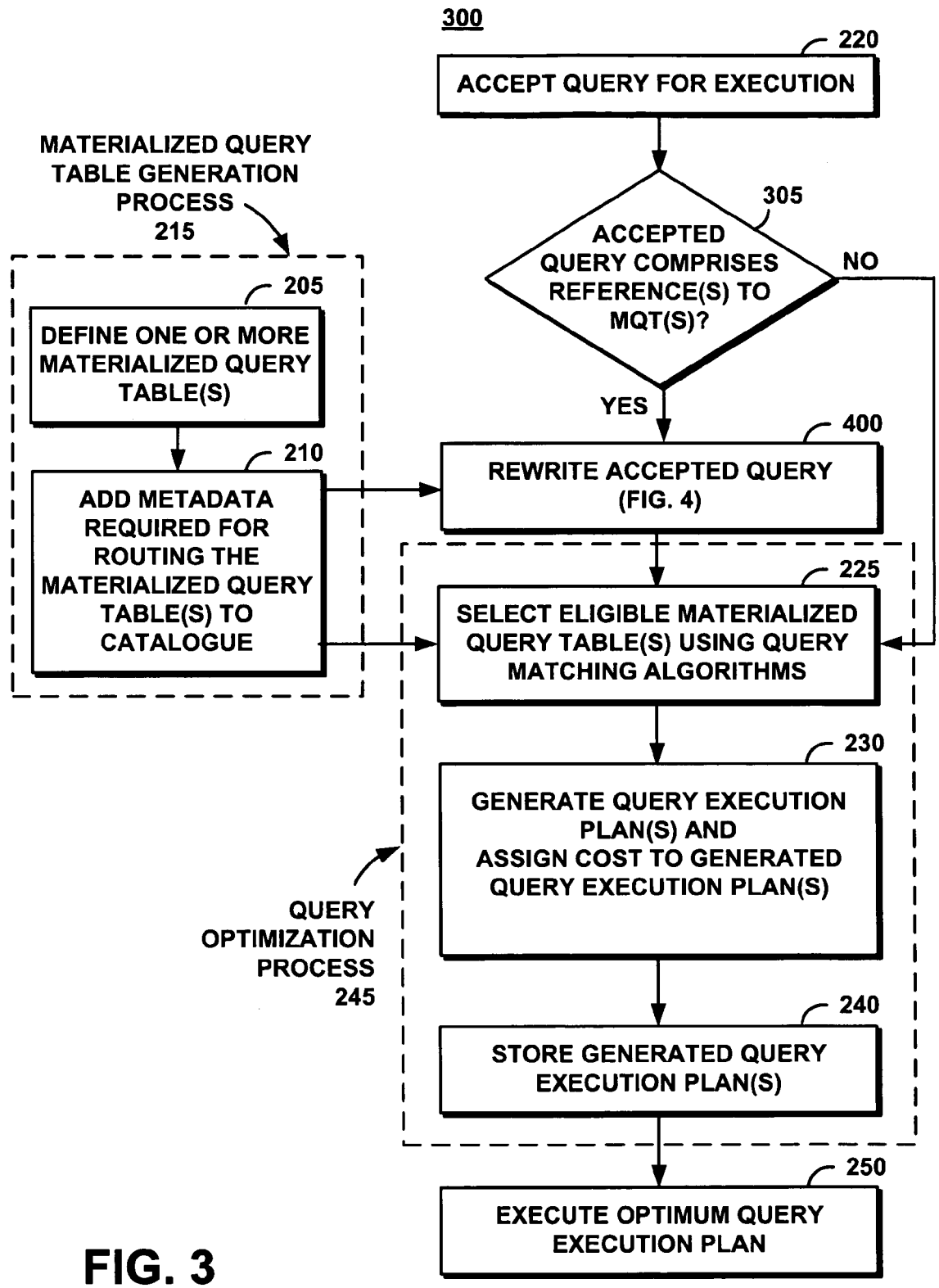
FIG. 3 is a process flow chart illustrating a method of utilizing materialized query tables and the reverse routing system of FIG. 1 in executing a query.

FIG. 3 (305 and 400 are really part of the optimization process 245) illustrates a method 300 of the query optimizer 95 in optimizing a query execution plan using system 10. The materialized query table generation process 215 generates materialized query table(s) and metadata required for routing the materialized query tables, as previously described. The RDBMS 20 accepts a query for execution (step 305). The query optimizer 95 determines whether the accepted query comprises one or more references to one or more materialized query tables (MQTs) (decision step 310). If yes, system 10 rewrites the accepted query as described in FIG. 4 (step 400). The query optimizer 95 executes the query optimization process 245 as previously described. The query optimizer 95 selects an optimum query based on cost; the RDBMS 20 executes the optimum query (step 250).

If the accepted query does not comprise a reference to a materialized query table (decision step 310), the query optimizer 95 proceeds to step 225 and executes the query optimization process 245 as previously described.

FIG. 4 illustrates a method 400 of system 10 in rewriting a query to substitute a query phrase for references to materialized query tables in the accepted query of step 305, FIG. 3. System 10 receives a query that directly references one or more materialized query tables (step 405). System 10 identifies the materialized query tables referenced in the received query (step 410).

For each of the referenced materialized query tables, system 10 identifies a defining query associated with the referenced materialized query table (step 415). For each of the referenced materialized query tables, system 10 substitutes the identified defining query for the referenced materialized query table (step 420) in the received query. System 10 initializes an eligibility list of materialized query tables with the referenced materialized query tables (step 425). The query optimizer 95 considers routing to the referenced materialized query tables along with the eligible materialized query table(s) selected using query matching algorithms (step 225, FIG. 3).

This present system provides particular benefits in cases where the database tables referenced in a definition of the materialized query table are co-located with tables being joined with the materialized query tables. This situation occurs, for example, when a federated system is queried. The present system provides further benefits when the referenced database tables have indices more useful to a query than those than indices defined on the material query tables.

It is to be understood that the specific embodiments of the invention that have been described are merely illustrative of certain applications of the principle of the present invention. Numerous modifications may be made to the system and method for reverse routing a materialized query table described herein without departing from the spirit and scope of the present invention. Moreover, while the present invention is described for illustration purpose only in relation to a relational database management system, it should be clear that the invention is applicable as well to, for example, any type of database. Furthermore, any type of computer, such as a mainframe, minicomputer, personal computer, or computer configuration, can be used with the present invention.

What is claimed is:

1. A processor-implemented method for reverse routing a materialized query table in a database, comprising:

receiving a query referencing the materialized query table, wherein the contents of the materialized query table are defined by the query;

identifying a defining query associated with the referenced materialized query table;

substituting the defining query for the referenced materialized query table in the received query in order to create a semantically equivalent version of the received query that does not directly reference the materialized query table;

generating an execution plan based on the materialized query table; and executing the execution plan to output a query result.

2. The method of claim 1, further comprising generating a set of eligible materialized query tables.

3. The method of claim 2, further comprising adding the referenced materialized query table to the set of eligible materialized query tables.

4. The method of claim 2, wherein generating the set of eligible materialized query tables comprises establishing a catalogue of materialized tables; and
   wherein the set of eligible materialized query tables comprises materialized query tables from the catalogue that match the received query.

5. The method of claim 4, further comprising unioning the referenced materialized query table referenced in the received query with the materialized query tables of the set of eligible materialized query tables, to generate a list of materialized query tables.

6. The method of claim 5, further comprising using the list of materialized query tables to generate the query execution plan.

7. A computer program product having program codes stored on a computer-usable medium for reverse routing a materialized query table in a database, comprising:
   a program code for receiving a query referencing the materialized query table, wherein the contents of the materialized query table are defined by the query;
   a program code for identifying a defining query associated with the referenced materialized query table;
   a program code for substituting the defining query for the referenced materialized query table in the received query in order to create a semantically equivalent version of the received query that does not directly reference the materialized query table;
   a program code for generating an execution plan based on the materialized query table; and
   a program code for executing the execution plan to output a query result.

8. The computer program product of claim 7, further comprising a program code for generating a set of eligible materialized query tables.

9. The computer program product of claim 8, further comprising a program code for adding the referenced materialized query table to the set of eligible materialized query tables.

10. The computer program product of claim 8, wherein the program code for generating the set of eligible materialized query tables establishes a catalogue of materialized tables; and
    wherein the set of eligible materialized query tables comprises materialized query tables from the catalogue that match the received query.

11. The computer program product of claim 10, further comprising a program code for unioning the referenced materialized query table referenced in the received query with the materialized query tables of the set of eligible materialized query tables, to generate a list of materialized query tables.

12. The computer program product of claim 11, further comprising a program code for using the list of materialized query tables to generate the query execution plan.

13. A processor-implemented system for reverse routing a materialized query table in a database, comprising:
    a database service module for receiving a query referencing the materialized query table, wherein the contents of the materialized query table are defined by the query;
    a reverse routing module for identifying a defining query associated with the referenced materialized query table;
    the reverse routing module substituting the defining query for the referenced materialized query table in the received query in order to create a semantically equivalent version of the received query that does not directly reference the materialized query table;
    a query optimizer generating an execution plan based on the materialized query table; and
    the query optimizer executing the execution plan to output a query result.

14. The system of claim 13, wherein the query optimizer generates a set of eligible materialized query tables.

15. The system of claim 14, wherein the query optimizer adds the referenced materialized query table to the set of eligible materialized query tables.

16. The system of claim 14, wherein the query optimizer generates the set of eligible materialized query tables by establishing a catalogue of materialized tables; and
    wherein the set of eligible materialized query tables comprises materialized query tables from the catalogue that match the received query.

17. The system of claim 16, wherein the query optimizer unions the referenced materialized query table referenced in the received query with the materialized query tables of the set of eligible materialized query tables, to generate a list of materialized query tables.

18. The system of claim 17, wherein the query optimizer uses the list of materialized query tables to generate a query execution plan.

* * * * *